United States Patent
Von Cleve

[11] 3,727,679
[45] Apr. 17, 1973

[54] MECHANICAL DRAFT COOLING OR CONDENSING PLANT

[75] Inventor: Hans-Henning Von Cleve, Bochum, Germany

[73] Assignee: Gea Luffkuhlergesellschaft Happel GmbH, Bochum, Germany

[22] Filed: July 23, 1971

[21] Appl. No.: 165,652

[30] Foreign Application Priority Data

Jan. 2, 1971 Germany..................P 21 00 018.0

[52] U.S. Cl. .................165/111, 165/125, 261/.011, 261/24, 261/30, 165/122
[51] Int. Cl. ...........................................F28f 13/00
[58] Field of Search.................165/111, 121, 122, 165/125; 261/24, 30, DIG. 11

[56] References Cited

UNITED STATES PATENTS

| 3,175,960 | 3/1965 | Kassat | 165/122 X |
| 3,165,455 | 1/1965 | Rose et al. | 165/111 X |
| 2,732,190 | 1/1956 | Mart | 261/DIG. 11 |

FOREIGN PATENTS OR APPLICATIONS 908,446  10/1962  Great Britain.....................165/122

Primary Examiner—Charles J. Myhre
Assistant Examiner—Theophil W. Streule, Jr.
Attorney—Michael S. Striker

[57] ABSTRACT

A mechanical draft cooling or condensing plant for air cooling or condensing a medium conducted in a closed circuit, particularly a plant of major cooling capacity, in which mechanical draft cooling air enters the plant substantially in the horizontal direction through vertical walls in the plant and the medium to be cooled flows through plate-shaped cooling elements composed of a plurality of finned tubes, the cooling elements extending in vertical planes and, together with bearing and support means, form one or more of the substantially vertical walls which are zig-zag-shaped in plan, and wherein, viewed in the direction of flow of the cooling air in front of and/or behind the walls a large number of extractor and blower fans are disposed in uniform distribution over the entire surface of the wall or walls in immediate proximity with the cooling elements, the fans being placed so that their blades revolve in vertical planes.

25 Claims, 10 Drawing Figures

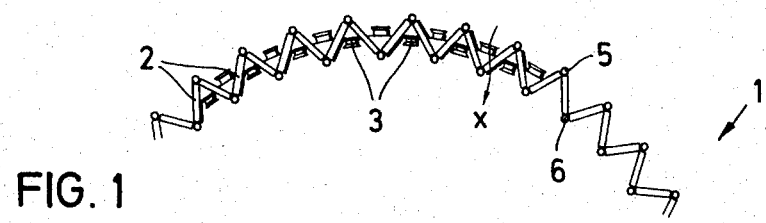
FIG. 1
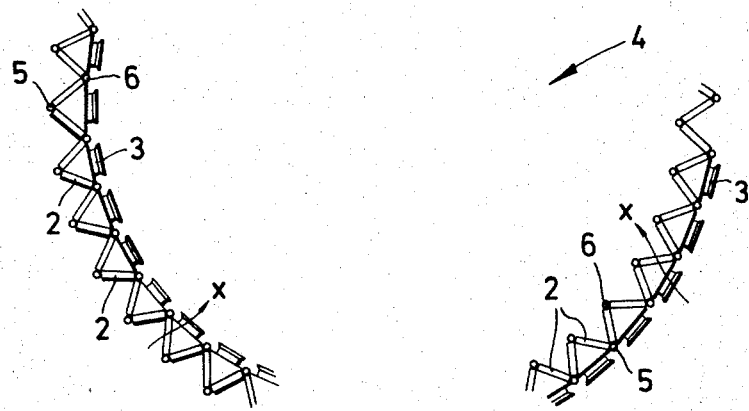
FIG. 2
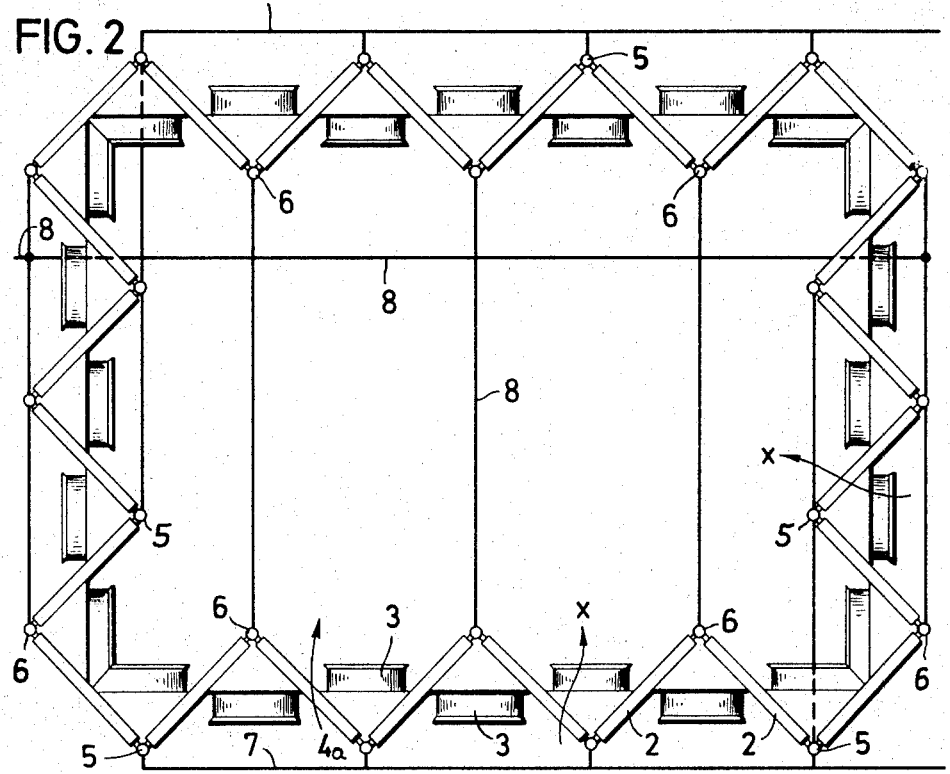
INVENTOR
HANS-HENNING VON CLEVE
BY
Michael S. Striker
ATTORNEY INVENTOR
HANS-HENNING VON CLEVE
BY
Michael S. Struker
ATTORNEY 3,727,679

MECHANICAL DRAFT COOLING OR CONDENSING PLANT

BACKGROUND OF THE INVENTION

1. Field of the Invention

This invention relates generally to a mechanical draft cooling or condensing plant for air cooling or condensing a medium conducted therethrough in a closed circuit, particularly to a plant of major cooling capacity.

2. Description of the Prior Art

Mechanical draft cooling and condensing plants of this kind have hitherto been constructed substantially only for smaller capacity recooling units whereas plants for larger cooling capacity have usually been built for natural draft. Natural draft recooling plants have the form of shaft-like towers of relatively great hight and, according to the desired performance, of very considerable diameter, to enable the large volumes of air required for cooling to be drawn in by natural induction through the cooling elements in the lower part of the tower. One objection to such cooling towers is their unsightliness in the landscape, a circumstance which often militates against their erection. Moreover, they are of major weight and if the bearing capacity of the subsoil is poor they require major foundations which greatly add to the cost of such a tower. Moreover, natural draft cooling towers are very sensitive to movement of the atmospheric air and their performance may be greatly affected by wind.

Mechanical draft recooling towers largely avoid these drawbacks, firstly because they are smaller, particularly lower in height and less conspicuous in the landscape and secondly because they weigh less and therefore require less expensive foundations. Moreover, their performance is less affected by wind than that of natural draft towers.

In mechanical draft recooling plants of the above type, as already proposed in the art for cooling liquids, the walls formed by the cooling elements constitute at least one and possibly several side walls of an enclosed cell which has a flat roof provided with one or more circular large diameter openings each for accommodating the blades of a horizontally disposed fan. These openings are surrounded by shaft-like ducts, referred to as diffusers, which project several meters beyond the top of the roof.

This known type of construction is principally open to the objection that for technical as well as economical reasons it is unsuitable for major levels of performance. In large capacity plants which require particularly extensive cooling surfaces the walls formed by the cooling elements must also be of considerable height to keep the area of the floor space occupied by the cooling plant within reasonable bounds. In view of the height of the walls and the location of the fans on the cell roof the structures supporting the fans must necessarily likewise be tall. Owing to the rapid rotation of the fan blades which generate considerable forces as well as vibrations and the not inconsiderable weight of the drive means of the fans, the supports must be particularly strong and all this raises the cost. A lower cell would involve a reduction in the available cooling element surface or an increase in the occupied floor space. In the first case performance would be reduced and in the latter case the use of more floor space would not be economic, and in the majority of cases local conditions would not permit it. Furthermore, in the prior form of construction aerodynamic losses are particularly high, since the cooling air must be deflected through 90° between the cooling elements and the fans.

Finally the prior art form of construction has the drawback that the size of the walls formed by the cooling elements, and hence the heat exchanging surface is restricted between this surface must not exceed that commensurate with the performance of the fans. A further increase in the size of the walls formed by the cooling elements would not be useful because the draft induced by the fans would not then be sufficient for cooling the entire heat exchanging cooling surface. If a proper utilization of major cooling surfaces were to be attained the performance of the fans would have to be correspondingly raised and, in view of the forces that are involved, this could not be achieved merely by further increasing the size of the fans, but would necessitate the provision of additional fans, If such additional fans were disposed for instance in two rows side by side at the level of the roof then additional supports and bearing elements for the fans would also be needed and the cost involved would again offset the advantage of a better performance of the plant.

Another drawback of the prior art form of construction consist in that the cells comprising two parallel side walls composed of cooling elements must be of elongated design and cannot in plan have the shape of say a circle, a U, a V or the like. The reason for this is that for instance in circular cells at least some of the air that has already been warmed is again drawn through the inner walls of cooling elements which face each other, although this air is naturally incapable of cooling the medium in the desired way. When this occurs the performance of the plant is considerably reduced and in the prior art form of construction this cannot be avoided otherwise than by extended elongate form of construction and disposition of the individual cells and by rejecting any kind of design in which the cells form an inner space that is enclosed on all sides or even largely enclosed. Particularly in large capacity plants, an elongated design occupies considerable space which is often not available. Moreover, in the prior art form of construction even available space can often not be utilized because of the conditions that have been described and frequently major difficulties arise when planning such plant. If the individual elongated cells are placed in parallel they must be very widely spaced to prevent recirculation of the cooling air and mutual interference between neighboring cells. This free intervening space cannot usually be utilized for other purposes because the presence therein of other structures or buildings would obstruct the entry of fresh cooling air. An economic utilization of such spaces is therefore usually out of the question.

Yet another drawback of the prior art form of construction is that only previously heated air passes through the fans. This means that, owing to the expansion of the cooling air, the fans must handle a larger volume of air than would be the case if the air were still cold. Consequently, the prior art form of construction requires a fan capable of handling a larger volume of air, i.e. a fan of larger output. The fact that in the prior art form of construction the fan is located in the region of the hot cooling air has the further drawback that the fan, particularly the blades of the fan, must be constructed of a heatresistant material. Also, special precautions must be taken to ensure that the heat is efficiently abstracted from the drive means of the fan, particularly from the fan motor. Owing to the elevated temperature of the air in the environment of the fan this is difficult to accomplish. In any event special steps must be taken to prevent the operating temperature of the fan drive from rising beyond the admissible level, and this again naturally costs more money and adversely affects the price cost of the plant.

SUMMARY OF THE INVENTION

It is the object of the present invention to provide a mechanical draft cooling or condensing plant for air cooling or condensing a medium, of the above-specified kind, which does not suffer from the described drawbacks, and which is nevertheless suitable for erection in large capacity units though occupying only a comparatively small floor space.

In accordance with the present invention a mechanical draft cooling or condensing plant is provided for air cooling or condensing a medium conducted in a close circuit, particularly plant of major cooling capacity, in which the mechanical draft cooling air substantially in the horizontal direction through at least one substantially vertical wall in the plant and the medium to be cooled flows through plate-shaped cooling elements composed of a plurality of finned tubes, said cooling elements extending in substantially vertical planes and, together with bearing and support means, form one or more of the substantially vertical walls, and wherein, viewed in the direction of flow of the cooling air, fans at least in front of or in back of said walls are disposed over the surface of said wall or walls in immediate proximity with said cooling elements, said fans being placed so that their blades revolve in substantially vertical planes.

This arrangement of the fans enables the cooling and condensing plant to be far more favorably designed from both the technical and economical points of view. In the first place, contrary to the prior art form of construction, the proposed plant permits the height and length of a wall formed by cooling elements to be chosen substantially without any restriction exclusively with reference to the overall size of the cooling surface that is desired, and at the same time local conditions can be taken fully into account in the design. For example, if the available floor space is large, walls of low height will be preferred, whereas in the event of the available floor space being restricted, an extremely tall wall can be provided without causing problems. In the proposed arrangement difficulties involved in building high walls, such as arise in the prior art plant, are entirely absent. Moreover, no unduly high aerodynamic losses are likely because in the proposed arrangement the fan blades revolve in vertical planes in direct proximity with the cooling elements so that no significant gap exists between the fan blades and the cooling elements. Nor must the air stream be deflected through an angle of 90° as is the case in the prior art form of construction. The difficulties which occur in the latter design when the walls are very high are eliminated in the present invention because the fans are more numerous and therefore substantially smaller and lighter in weight, so that their provision even at considerable heights presents no particular problems. Moreover, the forces that are generated by fans revolving in vertical planes are more easy to control because they act in or parallel to the plane of the wall and not, as formerly, in the horizontal, i.e. across the side walls of the cell. Furthermore, owing to the smaller size and lower weight of the fans, these forces are also very much smaller. The relatively heavy and stable support means for the fans in the prior art form of construction can therefore be eliminated with a corresponding saving in cost.

The proposed cooling and condensing plant has yet another advantage, namely that it can be designed for any desired capacity and even for the greatest capacity. Particularly for high performance plants, it is an important factor that the floor space required by the proposed plant can be reduced by as much as 10 to 30 percent below that needed by prior art plants, because of the possibility of more suitably dimensioning the cooling element walls. The saving in floor space is partly also due to the flow velocity of the cooling air in the neighborhood of the cooling elements being greater than in a prior art arrangement containing fans of the same overall performance, since the fans in the proposed plant are close to the cooling elements and function more efficiently because they handle cold air. Moreover, the aerodynamic losses present in the prior art form of construction do not arise. The transfer of heat between the heat yielding surfaces and the cooling air is better at higher velocities of air flow and the heat transferring surfaces are therefore better utilized than heretofore. Consequently in the present form of construction the cooling surface for a given cooling and fan performance can be less. A smaller cooling surface naturally requires less floor space and the proposed plant therefore occupies less space than the former design not only because of the better disposition and geometry of the cooling elements but also because of the reduction in size of the necessary cooling surface.

Furthermore in the proposed plant the walls formed by the cooling elements can be arranged in substantially any desired way and it is therefore readily possible to adopt an arrangement that is best suited to local conditions. The proposed plant can be erected practically anywhere because even angular and asymetrical floor areas can be fully utilized. The plant can also be planned to harmonize with the landscape and skyline because it can be designed without special restrictions and need not be of cellular construction, the plant generally simply consisting of free-standing walls. For instance, the erection of tall towers in flat landscapes can be avoided or a natural hollow of any shape in the terrain can be used to erect a plant so that it is inconspicuous. Furthermore, the proposed plant has the advantage of being largely unaffected by wind due to the disposition of the fans in direct proximity with the cooling elements.

In a presently preferred embodiment of the invention the wall and/or walls composed of cooling elements may surround an inner space which is open only at the top. In such an arrangement the inner space in plan may usefully have the shape of a regular or irregular triangle, quadrilateral or polygon. Nevertheless, in certain cases it may be more convenient for the inner space in plan to be circular, elliptical, oval or a geometrical figure of some alternative curvilinear outline. Yet another possibility is for the wall or walls composed of cooling elements not to completely surround an inner space, but to be disposed in plan in the form of a U, T, V, W or some other open configuration. Finally the walls composed of cooling elements may be substantially parallel and placed some distance apart.

Apart from these preferred arrangements of the walls of cooling elements other forms would be feasible, particularly in the form of cooling and condensing plants in which the walls of cooling elements are disposed according to a combination of the above described different configurations. Which arrangement of the walls is chosen in a particular case must entirely depend upon existing local conditions, and primarily upon the floor space available for the erection of the plant.

According to another desirable feature of the invention the space between the walls of the plant may be used as a track, road, storage space or the like. Warm air continuously circulates through this space which is therefore well heated so that it is suitable for a variety of purposes. According to yet another feature of the invention the space above the walls may be used for the accommodation of cable or pipe bridge, a track for a crane or hoist or other equipment, the walls serving as the supporting members. The space between the walls is likewise useful for the accommodation of a cable or pipe bridge, particularly because such pipes will then be protected from freezing in the winter by virtue of their being continuously fanned by the warm air that has passed through the cooling elements.

According to a very useful feature the medium is supplied to and carried away from the cooling elements through substantially vertical upflow and downflow pipes which may incidentally serve as supporting columns for the associated wall, particularly for supporting and carrying the cooling elements. The advantage of such an arrangement resides in that pipe means of considerable diameter are in any event needed for supplying and carrying away the medium that is to be cooled, and such pipes are therefore also capable of bearing considerable mechanical loads. The utilization of upflow and downflow pipes as supporting columns for the walls composed of cooling elements eliminates the need for providing and erecting special supports for stabilization, and this circumstance considerably reduces the overall cost of the plant. Generally speaking it will be advisable for the heat exchanging tubes of each cooling element to be held in a special frame embracing the end face of the cooling element, and said frame can then be attached to the upflow and downflow pipes. It is also desirable to attach the fans and their air conducting rings to the frames of the cooling elements and/or to the upflow and downflow pipes.

In a currently preferred embodiment of the invention each fan and the associated cooling elements or portions of cooling elements, when viewed in a horizontal section through the relative part of the wall, define a preferable isosceles or equilateral triangle of which two sides are formed by the cooling elements or portions thereof and the third side by the fan. This feature enables the cooling stream of air generated by one fan to be used for simultaneously cooling several cooling elements or portions of cooling elements. The two sides of a triangle defined by cooling elements may be formed by a single or preferably a like number of complete cooling elements. Alternatively it would be possible for at least one and preferably both sides of a triangle formed by cooling elements to consist of only a portion of a cooling element. In such a case at least one and possibly two or all corners of a triangel defined by a fan, cooling elements or portions thereof may be constituted by an upflow or a downflow pipe.

It has proved to be convenient to dispose the fans aligning in vertical rows. This method of disposing and securing the fans simplifies the design and corresponds to the subdivision of the wall by the superimposed cooling elements. In an alternative arrangement of the invention the fan blades of fans disposed in a vertical row may each rotate in a vertical plane which is substantially parallel to the associated cooling element or elements and inclined to the planes defined by neighboring rows of fans. Which of these alternatives is used in practice will again depend upon the performance specification and hence upon the size of the plant as well as upon environmental factors.

Generally it will be available to provide, in the plane containing the fans, plates that cover the cooling elements between neighboring fans comprised in the same vertical row, said plates having openings for accommodating the fans. The presence of such a cover plate ensures that the cooling air stream generated by the fans must in fact pass through the cooling elements. Also the presence of the cover plate prevents wind from interfering with the desired conditions of aerodynamic flow and from adversely affecting the cooling effect. If such cover plates are provided and the fans and the cover plates are located in alternation in front of and behind the cooling elements or portions of cooling elements, when viewed in the direction of air flow, it is preferred that the adjacent edge of neighboring cover plates should be attached to the sides of the cooling elements in the same longitudinal and widthwise positions, though on opposite sides, of said elements. This arrangement avoids the creation of portions of cooling elements that are not or that are insufficiently traversed by cooling air. A reduction in performance due to such a cause is thus avoided. Generally it will be best to attach the cover plates to the frames which embrace the end face of the relative cooling element and/or to the upflow or downflow pipe. However, in principle there is no reason why the cover plates should not be attached directly to the cooling elements.

For structural reason the presently preferred embodiment will comprise cooling elements in which the tubes conducting the medium that is to be cooled are disposed subatantially in the horizontal. Nevertheless, the idea which underlies the invention could also be realized in plant in which these tubes extend in the vertical.

The novel feature which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a plan view of a circular cooling and condensing plant according to one embodiment of the present invention;

FIG. 2 is a plan view of an alternative embodiment wherein a cooling and condensing plant according to the present invention is rectangular;

DESCRIPTION OF THE PREFERRED EMBODIMENTS

Figure 3:
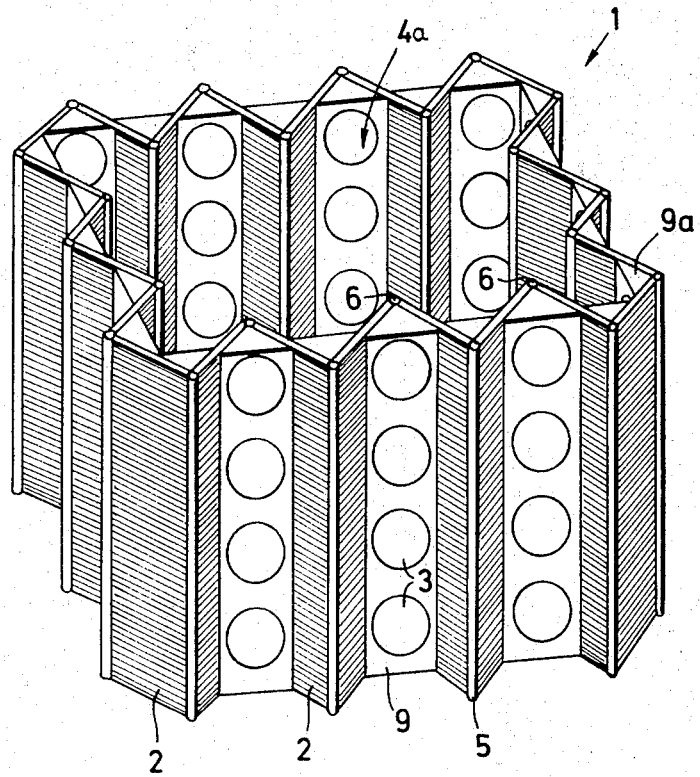
FIG. 3 is a perspective view of the plant shown in FIG. 2.

Referring to FIG. 1, a mechanical draft air-cooled closed circuit cooling or condensing plant of circular construction for a medium that is to be cooled or condensed is indicated generally by the reference numeral 1. The plant 1 comprises at least one wall, here a circular wall of arbitrary height composed substantially of cooling elements 2. Cooling air is circulated through the cooling elements 2, the air flowing substantially horizontally in the arrowed direction x, that is to say radially from the outside inwards. Inside the circular interior marked 4, which is surrounded by the cooling elements 2, the heated cooling air can freely escape in the upward direction. For generating the necessary current of cooling air, the plant 1 is equipped with a plurality of fans 3, where blades rotate in substantially verticle planes, functioning either as extractors or blowers for induced or forced flow. In order to demonstrate the available possibilities, FIG. 1 illustrates three different forms of construction which in principle could be combined in one plant. However, in practice it will be preferred to make use of only one or the other of the available possibilities in a particular plant.

In the embodiment illustrated at the bottom on the right hand side of FIG. 1 the fans 3 are all blowers, whereas in the embodiment at the bottom on the left hand side of FIG. 1 only extractors 3 are used. However, in the embodiment shown in the middle at the top of FIG. 1 an extractor and a blower fan 3 alternate in the assembly. Whether a fan 3 is a blower or an extractor is determined by its position in relation to the cooling elements 2, i.e. by whether it is located, in the direction of air flow, in front of or behind the cooling elements 2.

FIG. 2 illustrates a similar arrangement comprising blowers and extractors 3 as indicated at the top in FIG. 1. However, contrary to FIG. 1, the walls formed by the cooling elements 2 do not enclose a circular space but a substantially rectangular interior 4a.

In FIG. 1 as well as in FIG. 2 the upflow pipes marked 5 and the downflow pipes 6 for conveying the medium to and from the cooling elements 2 are clearly shown. It will be noted that the upflow pipes 5 which convey the medium which is still hot are located on the outside of the plant 1, whereas the downflow pipes 6 for conveying the cooled medium away are located in the interior of the plant 1. This arrangement has the advantage that during cold weather the plant 1 is unlikely to freeze up, because the upflow pipes 5 carry the hot medium, whereas the downflow pipes are kept warm by the heated cooling air. However, in principle, any other disposition of the upflow and downflow pipes 5 and 6 would be feasible. For instance, in the embodiment according to FIG. 2 the positions are reversed at the end walls of the plant 1 where this is the result of the alternating arrangement of the upflow and downflow pipes 5 and 6. All the upflow pipes 5 and all the downflow pipes 6 are interconnected by main admission pipes 7 and return pipes 8. The admission pipes 7 as well as the return pipes 8 are conveniently disposed below ground underneath the plant 1. Whereas in FIG. 1 these admission and return pipes 7 and 8 have been omitted, their positions are indicated in FIG. 2 by full lines.

FIG. 3 reveals that the fans 3 are disposed in vertical rows. Moreover, this figure also shows plates forming covers 9 which close the space between adjacent vertically aligned fans 3 and which force the cooling air to flow through the cooling elements 2. The proportions of the cooling elements that can be seen on the outside and that are not masked by covers 9 are masked by covers on their insides since their associated fans 3 are extractor fans and therefore located on the inside. The portions of the cooling elements 2 and the fans 3 and their covers enclose triangular spaces when seen in horizontal cross section. These spaces are closed at the bottom by the foundations not shown in FIG. 3 and at the top by triangular plates 9a which prevent the cooling air from escaping from the top of the triangular section space instead of flowing through the cooling elements 2 or the portions thereof.

Figure 4:
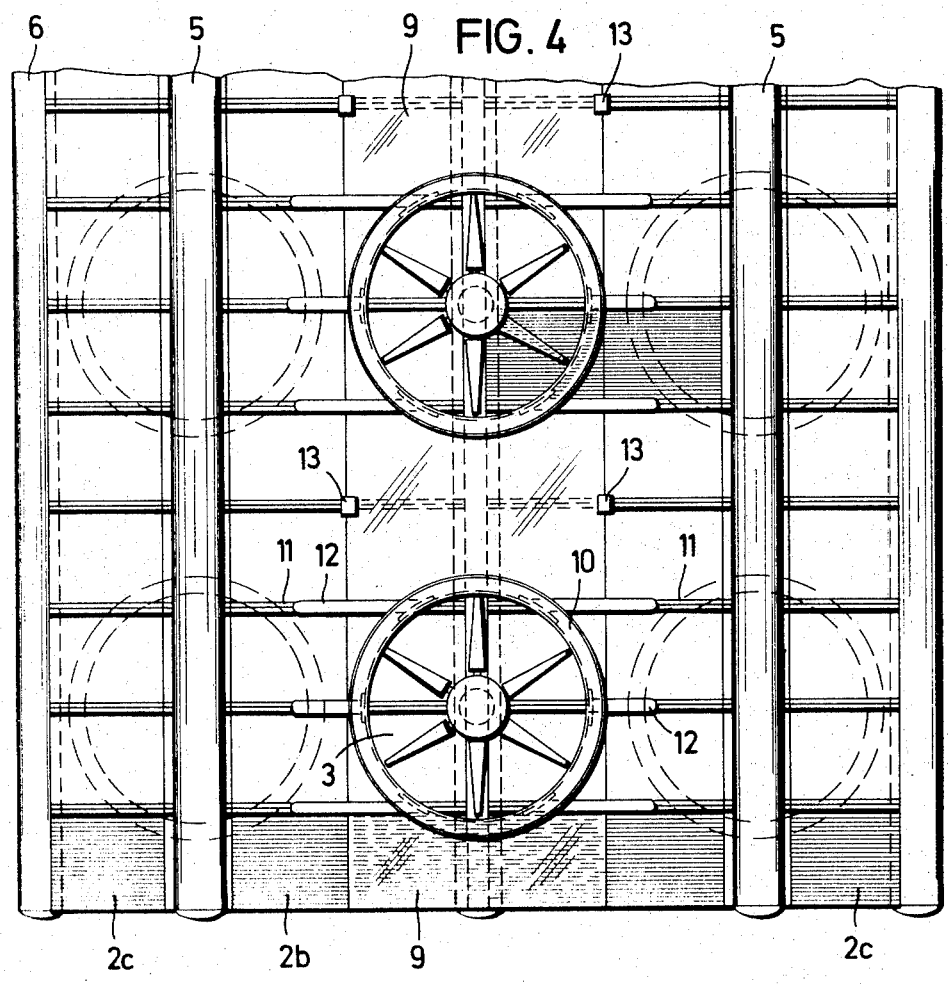
FIG. 4 is a side elevational view of a portion of a side wall composed of cooling elements.
Figure 5:
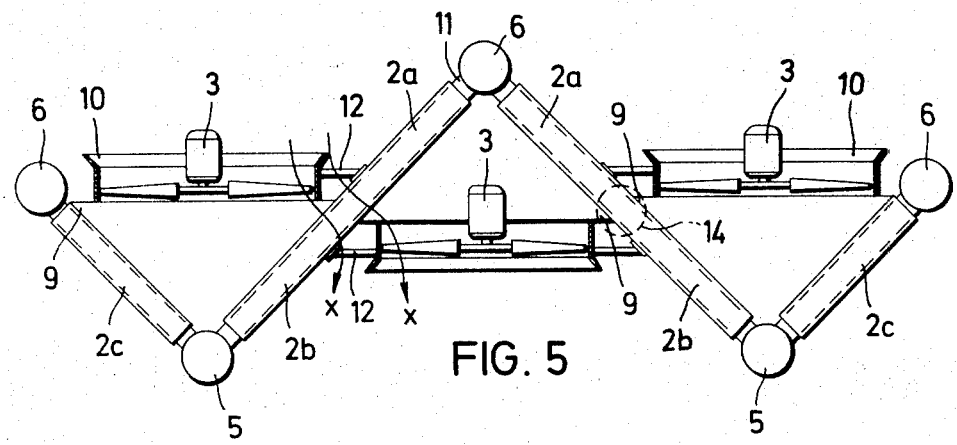
FIG. 5 is a top plan view of the side wall shown in FIG. 4.

FIGS. 4 and 5, being drawn to a larger scale, show the above-described arrangement of the several component parts particularly clearly. These component parts are identified in FIGS. 4 and 5 the same reference numerals as in FIGS. 1 to 3 so that the details that have already been described need not be repeated. However, it should be observed that FIGS. 4 and 5 illustrate two different embodiments namely one in which the cooling elements 2 consist of two portions 2a and 2b and each of these portions is cooled by air drawn or pushed by a different fan 3. This provides a spatial disposition in which each two cooling element portions 2a and a fan 3 together form an isosceles triangle, which in combination form the walls of the cooling or condensing plant 1. This form of construction is shown in the center in FIGS. 4 and 5. The two outer sections in FIGS. 4 and 5 illustrate a different form of construction in which one side of the abovementioned triangle is formed by a cooling element portion 2b, whereas the other side of the same triangle is formed by a complete, though shorter cooling element 2c. The third side of the triangle is again formed by the fan 3. Furthermore, it will also be understood from FIGS. 4 and 5 that the fans 3 are each surrounded by air-conducting ring 10 which is attached, like the fan 3 itself, to frames 11 which embrace the end faces of the cooling elements 2 and impart the necessary mechanical strength to the same. For holding the fans 3 and their air-conducting rings 10 special brackets 12 are provided. The covers 9 are likewise attached to the frames 11 of the cooling elements 2 by bracket arms 13. Otherwise FIG. 5 very clearly shows that in an alternating arrangement of the fans 3 and hence of the covers 9 when viewed in the direction of air flow, in front of and behind the cooling elements 2, 2c or portions 2a, 2b, the facing edges of neighboring covers 9 join the surfaces of the cooling elements in the same lengthwise and crosswise locations 14, though naturally on opposite sides.

Figure 6:
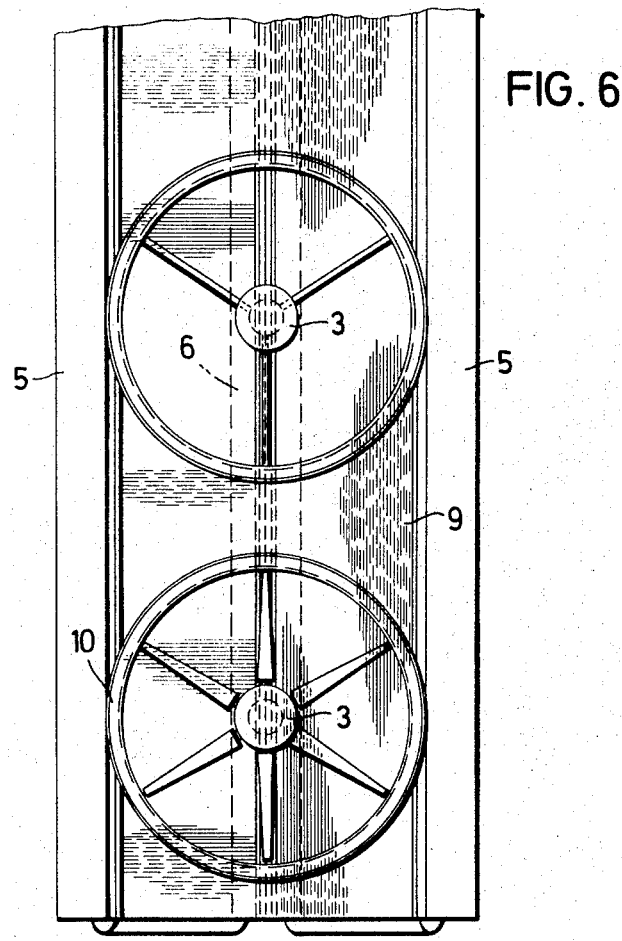
FIG. 6 is a side elevational view of a portion of a side wall of a different embodiment composed of cooling elements.
Figure 7:
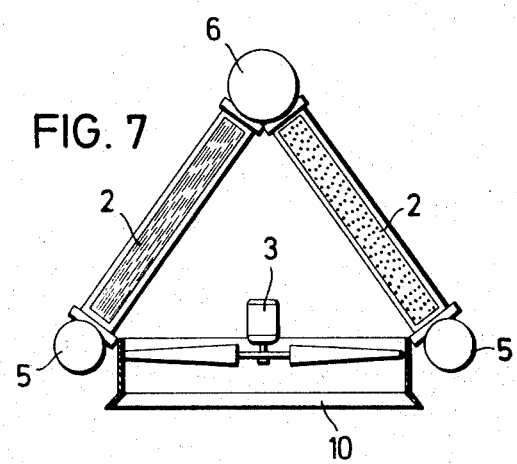
FIG. 7 is a top plan view of the side wall shown in FIG. 6.

Yet another embodiment of the invention is illustrated in FIGS. 6 and 7. Though only illustrated by a single triangular section, it will be understood that a complete cooling and condensing plant will possess a large number of such sections. The isosceles triangle shown in FIGS. 6 and 7 for a wall composed of cooling elements 2 merely differs from the corresponding triangle in FIGS. 4 and 5 in that two sides of this triangle are formed by complete cooling elements 2 and not only by cooling element portions 2a, 2b. It is indicated in FIG. 7 that the cooling elements 2 may contain horizontally disposed tubes as well as vertical tubes. In FIG. 7 this is indicated in the case of one triangle but this is merely intended to demonstrate the feasibility of such an arrangement since in practice the usual design will be for all tubes to be disposed in a uniform way.

Figure 8:
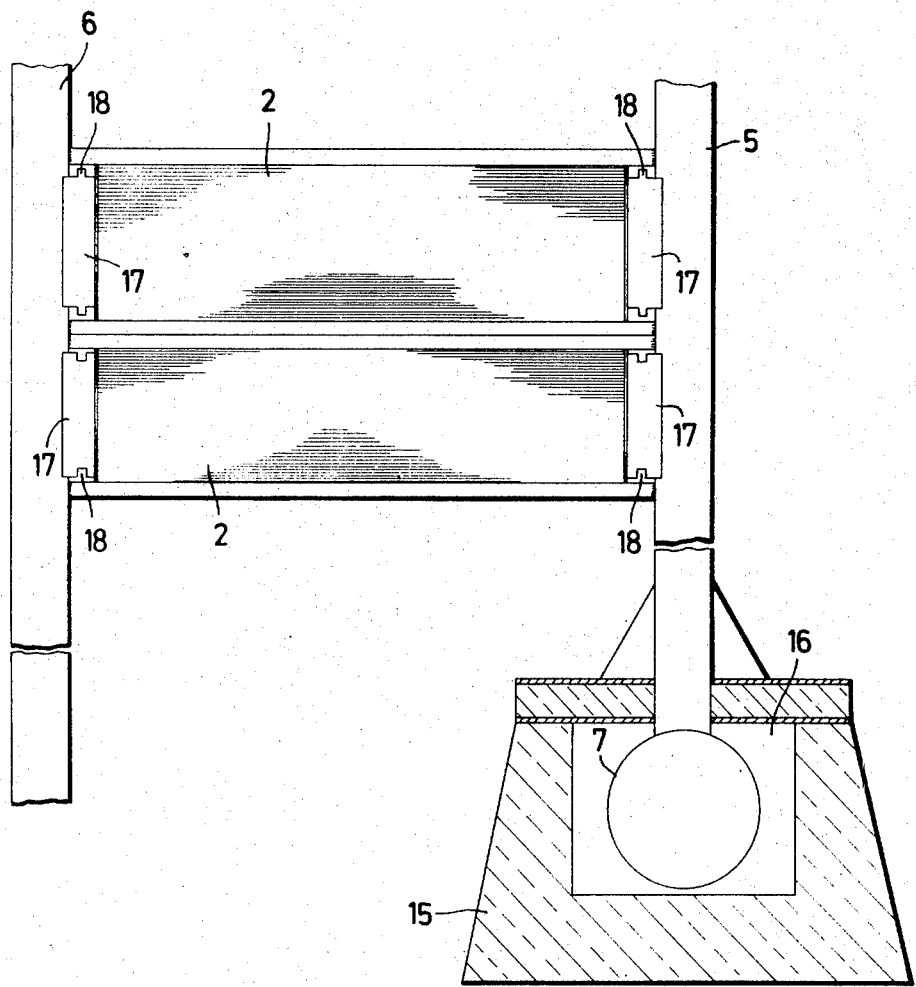
FIG. 8 is a side elevational view illustrating the connection of two cooling elements to an upflow or downflow pipe.

Partly shown in schematic, FIG. 8 illustrates the manner in which the cooling elements 2 are mechanically secured between an upflow pipe 5 and a downflow pipe 6 which may both also serve as columns supporting the cooling elements 2. For the sake of convenience only two cooling elements are shown in FIG. 8. It will be clearly seen that the upflow pipe 5 is itself supported by a foundation bed 15 to give it stability and to enable it to withstand the loads that will arise. The foundation bed 15 contains a channel 16 accommodating the admission pipe 7. The upflow pipe 5 communicates with this admission pipe 7, permitting the medium from the admission pipe 7 to enter the upflow pipe 5 and to flow through the cooling elements 2 to the downflow pipe 6. The downflow pipe 6 is supported by a similar foundation bed containing an outlet manifold, although this is not shown in FIG. 8. Between the upflow pipe 5 and the downflow pipe 6 distributing and collecting chamber 17 are provided which ensure that the tubes of the cooling element 2 are uniformly served with the medium and that the latter can freely return from all the tubes of the cooling elements 2. In order to avoid the occurrence of cracks and leaks which may be caused by differential thermal expansion, the chambers 17 have expanding sections 18 indicated in FIG. 8 by a corrugation in the chamber walls.

Figure 9:
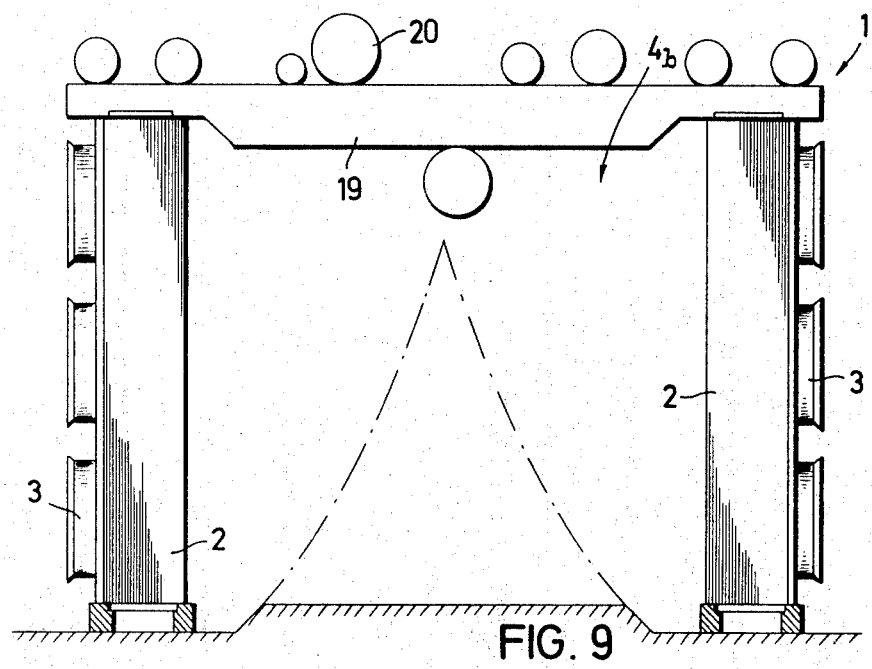
FIG. 9 is a vertical section of a cooling and condensing plant that also serves as a gantry for pipes.
Figure 10:
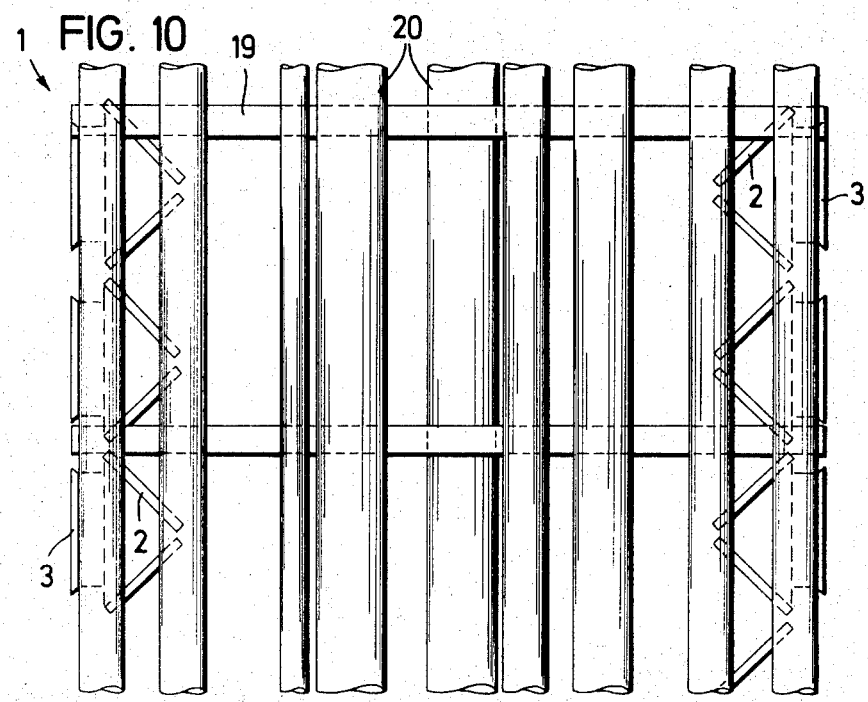
FIG. 10 is a top plan view of the plant shown in FIG. 9.

A particular form of construction of the cooling or condensing plant 1 is illustrated in FIGS. 9 and 10. The plant 1 shown in these Figures comprises two parallel walls composed of cooling elements 2 designed in exactly the same way as the walls in previously described embodiments. However, above the cooling elements 2 the walls are interconnected by beams 19 which also serve as support and carrier elements for pipes, ducts, cables and so forth 20. However, this equipment must not unduly or wholly obstruct the exhaust cross section. Pipework and cables 20 may also be suspended under the beams 19. The interior space marked 4b of this plant can be used as a track or road, as a storage space and so forth. In the latter case the inner space 4b must not be entirely filled up with stored goods, but only the portion below the dot-dash line; the remainder of the space must remain unobstructed to allow the cooling air to escape as required.

I claim:

1. In a plant of large cooling capacity for air cooling of water in a closed circuit, a combination comprising a plurality of wall shaped cooling elements each composed of a plurality of finned tubes for the passage of water to be cooled therethrough, said wall shaped cooling elements being respectively arranged in substantially vertical planes adjacent to each other and each pair of adjacent wall shaped cooling elements including an angle with each other; a third upright wall element formed with at least one circular opening and connected to each pair of adjacent wall shaped cooling elements to form with the latter a hollow upright prism of triangular cross section, the hollow prisms being connected to each other to form a structure which is substantially closed in circumferential direction and open at the top; and a ventilator arranged in each opening of the third wall elements, each having blades rotating in a substantially vertical plane for causing cooling air to pass in a substantially horizontal direction over the surfaces of said wall shaped cooling elements.

2. A combination as defined in claim 1, wherein the triangular cross section of each hollow prism has the shape of an isosceles triangle.

3. A combination as defined in claim 1, wherein each of said wall shaped cooling elements has a pair of opposite vertical edges and including connecting means for connecting the vertical edges of each pair of wall shaped cooling elements to each other.

4. A combination as defined in claim 3, wherein each third wall shaped element is connected to one of the connecting means of the wall shaped cooling elements of a respective pair.

5. A combination as defined in claim 3, wherein each third wall shaped element is connected to the respective pair of cooling elements intermediate the opposite vertical edges of the wall shaped cooling elements forming the respective pair.

6. A combination as defined in claim 3, wherein said connecting means are constituted by upright support members.

7. A combination as in claim 6, wherein adjacent support members are arranged relative to one another to define, in horizontal cross-section, points on isosceles triangles and wherein said elongated support members serve as upflow and downflow pipes.

8. A combination as in claim 7, wherein said triangles are equilaterial triangles.

9. A combination as in claim 7, wherein the two equal sides of said isosceles triangles are formed by said cooling elements and the third side by said fans.

10. A combination as in claim 8, wherein the sides of each triangle formed by said cooling elements are each defined by a like number of cooling elements.

11. A combination as in claim 8, wherein at least one side of each triangle formed by said cooling elements is defined by a portion of a cooling element.

12. A combination as in claim 7, wherein at least one of the corners of each triangle is formed by an upflow pipe.

13. A combination as in claim 7, wherein at least one of the corners of each triangle is formed by a downflow pipe.

14. A combination as defined in claim 6, wherein said upright support members are constituted by up-flow and down-flow pipes.

15. A combination as in claim 14, wherein said fins of each cooling element are supported by a frame structure embracing the edge of said cooling element, said frame being connected to said upflow and downflow pipes.

16. A combination as in claim 15, wherein said fans are mounted to said frames of said cooling elements.

17. A combination as in claim 14, wherein said fans are mounted to said upflow and downflow pipes.

18. A combination as defined in claim 14, wherein the flow of water to be cooled is from an up-flow pipe to a cooling element and from the latter to a down-flow pipe.

19. A combination as defined in claim 18, wherein all of said up-flow pipes are located at the outside of said structure and all of said down-flow pipes at the inside of said structure.

20. A combination as defined in claim 1, wherein said structure has a polygonal outline.

21. A combination as defined in claim 1, wherein said structure has a substantially circular outline.

22. A combination as defined in claim 1, wherein each of said third wall elements is provided with a plurality of circular openings and including a ventilator in each of the plurality of openings in each of said third wall elements.

23. A combination as defined in claim 22, wherein said plurality of openings in each third wall element are aligned with each other in vertical direction.

24. A combination as defined in claim 1, and including support means for supporting said structure on and in close proximity to the ground.

25. A combination as in claim 1, wherein said finned tubes are substantially horizontally disposed.

* * * * *